Aug. 29, 1950 E. T. NORD 2,520,329
WORK HOLDER
Original Filed Feb. 26, 1943 4 Sheets-Sheet 1

INVENTOR.
ERIC T. NORD
BY George W. Saywell
ATTORNEY

Aug. 29, 1950  E. T. NORD  2,520,329
WORK HOLDER
Original Filed Feb. 26, 1943  4 Sheets-Sheet 2
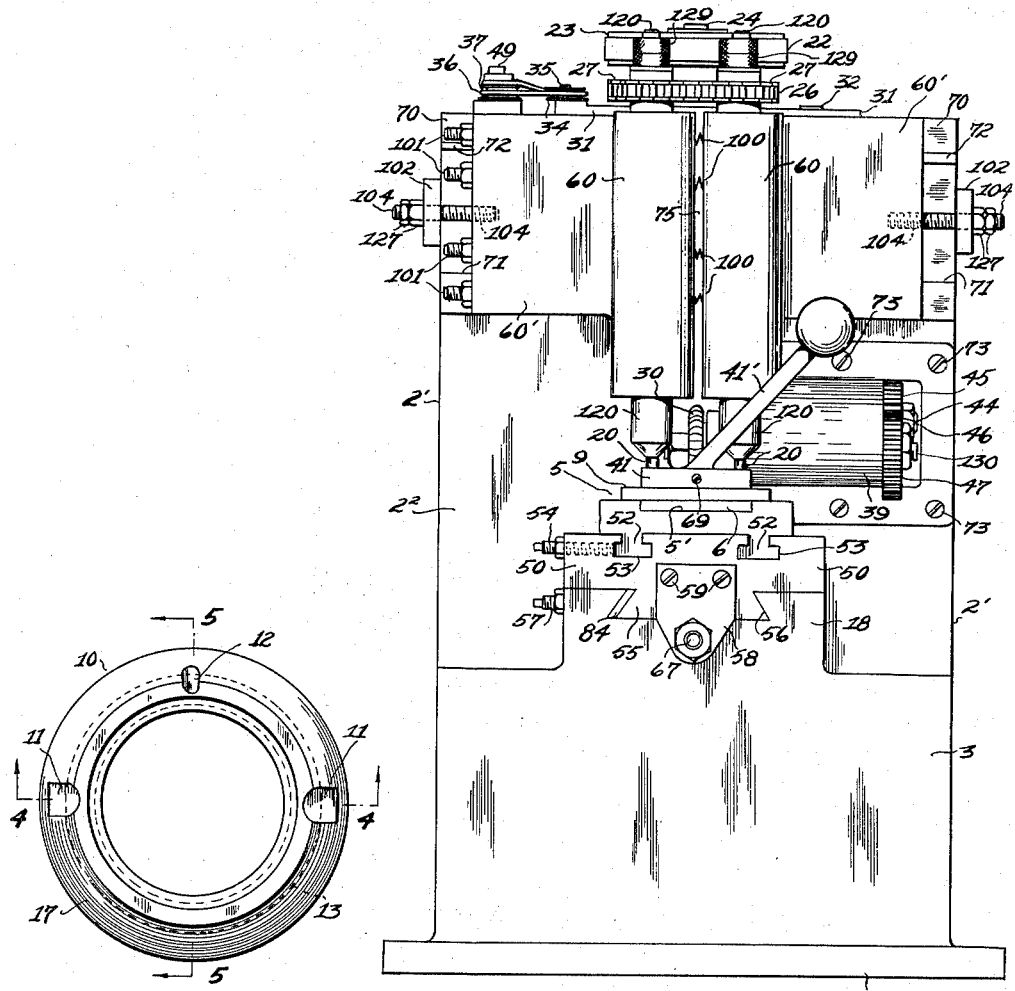
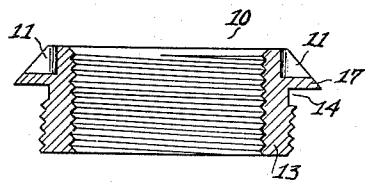
FIG. 4
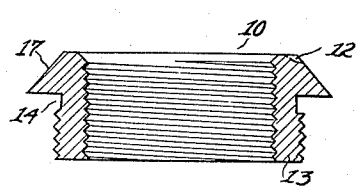
FIG. 5
INVENTOR.
ERIC T. NORD
BY
George W. Saywell
ATTORNEY Aug. 29, 1950     E. T. NORD     2,520,329
WORK HOLDER Original Filed Feb. 26, 1943     4 Sheets-Sheet 3

INVENTOR.
ERIC T. NORD
BY George W. Saywell
ATTORNEY

Aug. 29, 1950 E. T. NORD 2,520,329
WORK HOLDER
Original Filed Feb. 26, 1943 4 Sheets-Sheet 4
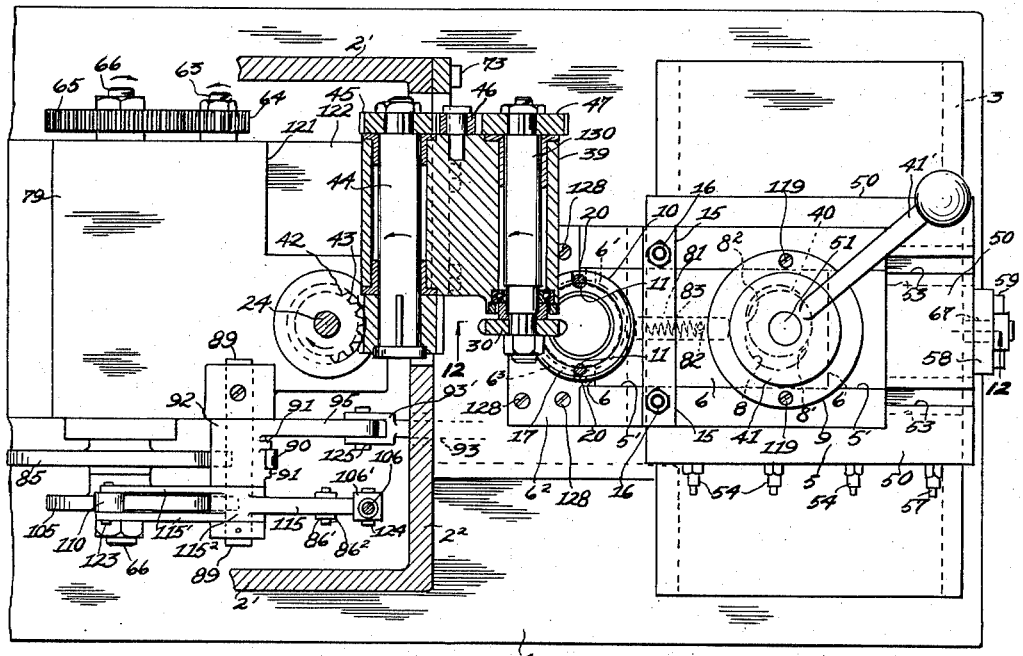
FIG. 10
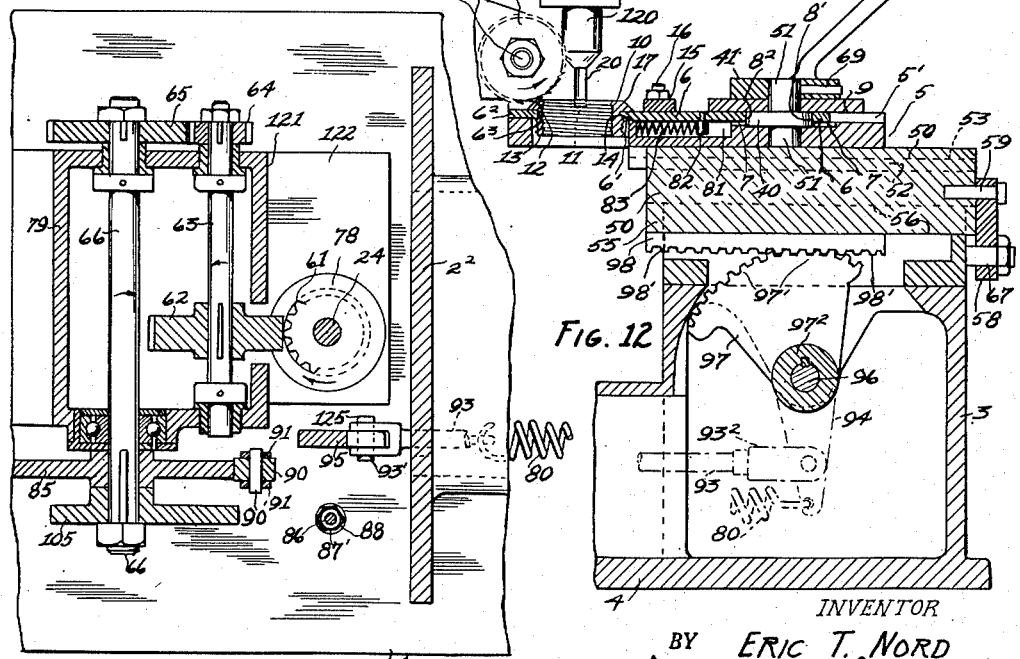
FIG. 11
FIG. 12
INVENTOR
BY ERIC T. NORD
George W. Saywell
ATTORNEY Patented Aug. 29, 1950

2,520,329

UNITED STATES PATENT OFFICE 2,520,329

WORK HOLDER

Eric T. Nord, Amherst, Ohio, assignor to U. S. Automatic Corporation, Amherst, Ohio, a corporation of Ohio Original application February 26, 1943, Serial No. 477,241, now Patent No. 2,402,179, dated June 18, 1946. Divided and this application April 4, 1945, Serial No. 586,593

1 Claim. (Cl. 90—59)

The invention relates to metal-cutting tools and particularly to a machine for performing multiple milling operations upon a succession of metal pieces or work fed thereto.

The subject matter claimed in the instant application is the improvement in work-holder assemblies and the means for actuating the same disclosed in a pending application filed by me on improvements in Milling Machines, Serial No. 477,241, filed February 26, 1943, now Patent No. 2,402,179, granted June 18, 1946, the instant application being a division of said application Serial No. 477,241.

The purposes of the invention disclosed in said application Serial No. 477,241 are the provision of a machine which will dispense with all but a minimum of manual operations, will rapidly and accurately effect a multiple of milling operations upon a plurality of metal parts successively fed thereto, which operations differ amongst themselves not only in that they produce different results in the work, but in that they are effected by different methods of approach of the work and the milling tools, the illustrative machine shown in the accompanying drawings and described in the following specification performing three milling operations in two different stages, in the first of which stages the work is moved against and into a cutting tool, and in the other of which stages two cutting tools are moved simultaneously into opposed parts of the work.

Claims to the improved methods of effecting varied milling operations upon a metal workpiece, just mentioned, are presented in my pending application Serial No. 586,592, filed April 4, 1945, Patent No. 2,433,145, granted Dec. 23, 1947.

The annexed drawings and the following description set forth in detail certain means illustrating the improved milling machine, such means constituting, however, only one of the various forms in which the principle of the invention may be embodied.

In said annexed drawings:

Figure 2 is a front elevation of the improved machine;

Figure 3 is a plan view of the piece or work operated upon by the particular form of improved machine shown in the accompanying drawings, the view in Figure 3 being that of a piece which has been completely milled by the improved machine;

Figure 4 is a section, taken in the plane indicated by the line 4—4, Figure 3, particularly showing two milling operations which were effected simultaneously in the second stage of operations upon diametrically opposite sides of the work;

Figure 5 is a section, taken in the plane indicated by the line 5—5, Figure 3, particularly illustrating another milling operation which was effected in the first stage of operations on the work;

Figure 10 is a plan section, taken in the planes indicated by the line 10—10, Figure 1;

Figure 11 is a fragmentary plan section, taken in the planes indicated by the line 11—11, Figure 1; and Figure 12 is a fragmentary longitudinal vertical section, taken in the plane indicated by the line 12—12, Figure 10.

Figure 1:
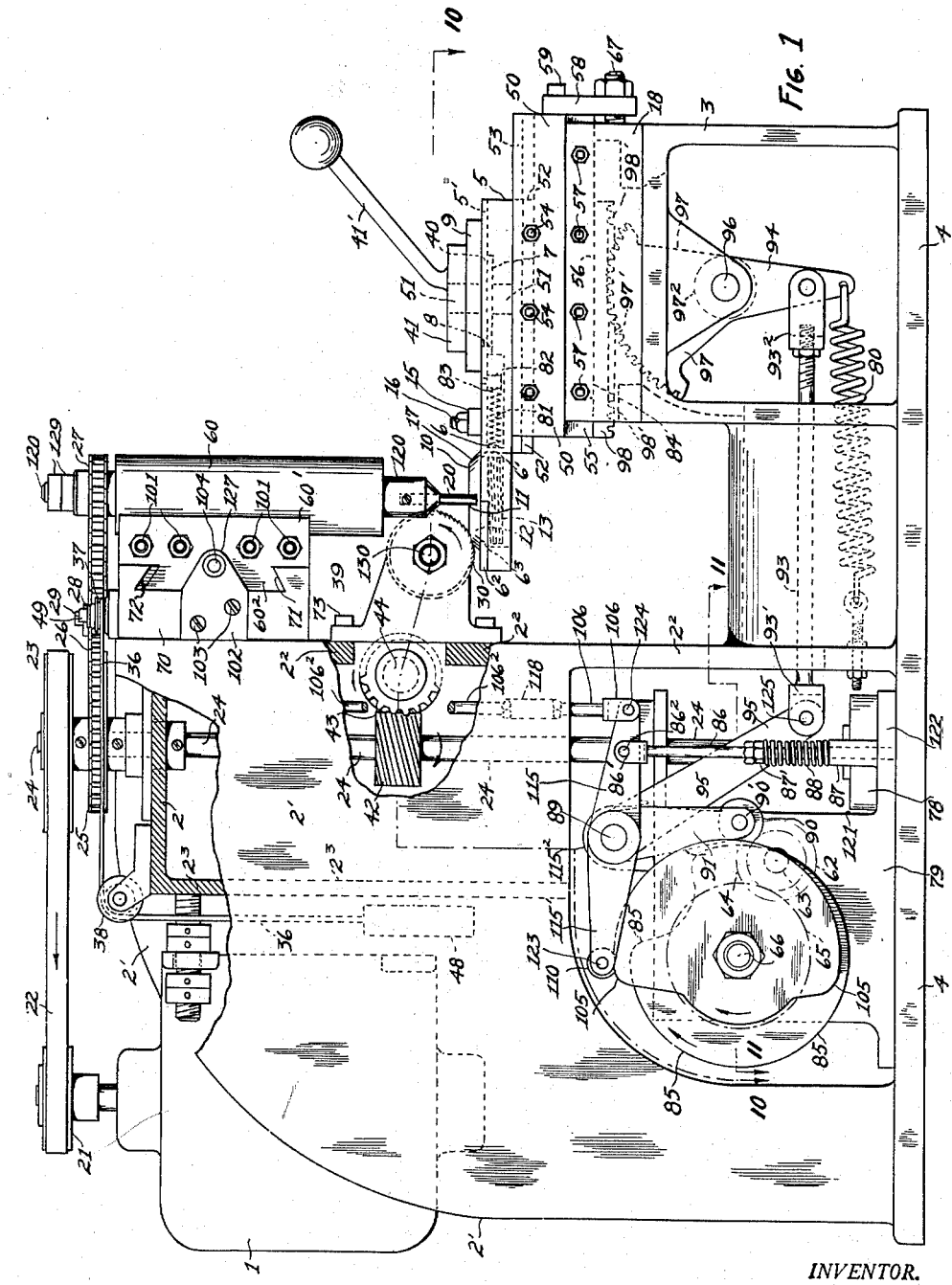
Figure 1 is a side elevation of the improved milling machine, the near side plate of the machine being partially broken away, the several elements of the machine appearing in the respective positions assumed by them immediately preceding the completion of all of the milling operations effected by the machine upon the work.

Referring to the annexed drawings in which the same parts are indicated by the same respective numbers in the several views, the operations which the improved milling machine performs upon the work, in the form of invention illustrated in the accompanying drawings, are shown in Figures 3, 4, and 5. The work 10 which, for instance, is a shell nose-piece or screw plug of annular formation, is given two milling cuts 11 at one end in diametrically opposed areas during the second stage of operations and a milling cut 12 at the same end in another area during the first stage of operations. The cuts 11 and 12 may serve various purposes, for instance, the cuts 11 might accommodate a spanner for placing or removing the piece 10 and the cut 12 might serve for the accommodation of a locking member.

The operations effecting the cuts 11 and 12 are performed while the piece 10 is positioned in a reciprocable table 5 of the improved machine, the accommodation of the piece 10 in the table 5 during the actual milling operations being shown in Figures 1, 7, 10, and 12. In fact, the positions of all the elements of the improved machine, as shown in all the views of the accompanying drawings, are those assumed by the several elements during the milling operations, the actual stage of the milling operations shown being that immediately prior to the completion of the diametrically opposite cuts 11, the cut 12 having previously been completed, but the milling cutter by which it was effected still being retained in cutting position and running idly through the cut 12 which it has completed.

The cut 12 is made by a milling cutter 30 rotated by a transverse horizontal shaft 130 extended transversely across and above a milling area, the work 10 being fed to the cutter 30 to effect the operation, and the diametrically opposed cuts 11 are made by a pair of millers 20, end mills in the embodiment disclosed, mounted in transversely opposed vertical spindles 120 which are reciprocable toward and from each other and the milling area, the cuts 11 being made by feeding the millers 20 into the work 10.

Figure 6:
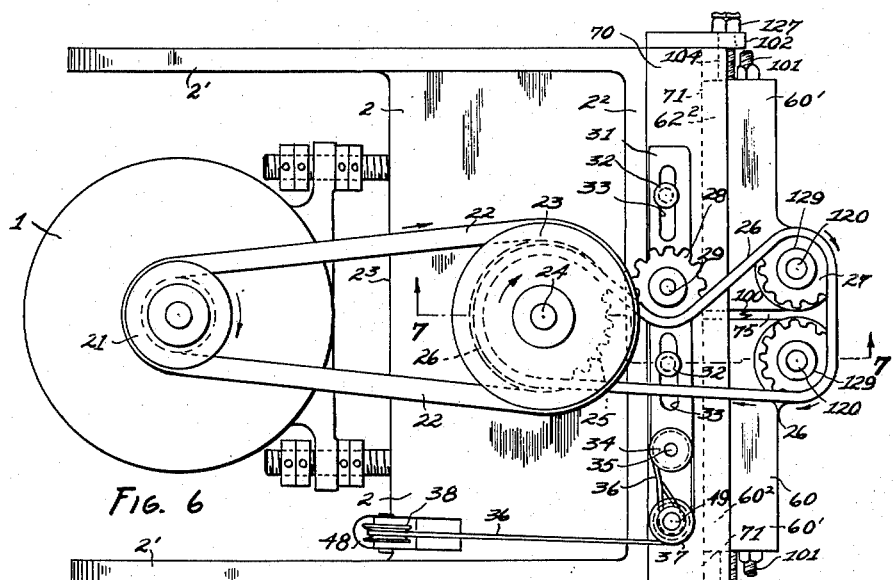
Figure 6 is a plan view of the left side of the upper portion of the machine shown in Figure 1.

Certain primary frame elements of the machine consist in a transverse top plate 2, Figures 1 and 6, disposed intermediate the longitudinal length of the machine and secured to machine side plates 2¹, Figures 1, 6, 8, 9, and 10, and having depending forward and rearward cross walls intermediate the side plates 2¹, of which the forward wall 2², Figures 1, 7, 8, 9, 10, and 11, extends downwardly to the frame base 4, and the rear wall 2³, Figure 1, extends downwardly to a certain area containing cams and other associated mechanism in the lower rear part of the machine, as hereinafter fully described. A front supporting frame portion of the machine is indicated by 3, and other certain frame parts will be particularly hereinafter mentioned in connection with the particular mechanisms which they support.

The cycle of operations, broadly stated, is as follows:

With the reciprocable table 5 in a retracted position from the milling area (its extreme right-hand position, which is the opposite extreme from that shown in Figures 1 and 10, for instance), certain elements accessory to the table 5 are opened so that a piece 10 may be positioned therein. Then, the accessory elements are closed to lock the piece 10 in the table 5 and the latter then moved to the left, Figures 1 and 10, to bring the piece 10 into the milling area, by the action of a cam 85 and connecting mechanism, Figures 1, 10, and 11, and the work 10 fed thereby into the cutter 30 to effect the cut 12. Then, the opposed pair of spindles 120 carrying the millers 20 are fed transversely inwardly toward each other, by a cam 105 and associated mechanism, Figures 1, 2, 6, and 9, to cause the millers 20 gradually to move into the work 10 to effect the diametrically opposed cuts 11. During the cutting operations effected by the opposed millers 20, the cutter 30 rotates idly through the cut 12 which it has already effected, in the position shown in Figures 1 and 12.

A tension spring 80, Figures 1, 11, and 12, tends to retract the table 5 and does so retract it when the action of the cam 85 and its cooperating roller 90 so permit. A compression spring 88, Figures 1 and 11, tends to spread the reciprocable spindles 120 and does so when its controlling cam 105 and cooperating roller 110 so permit. As before stated, the positions of the elements shown in the accompanying drawings are those assumed immediately prior to the completion of the cutting operations, so that the cams 85 and 105 and their associated elements, and also the controlling springs, are shown in their relative positions at this stage of the operations.

When the cuts 11 are completed, the springs 80 and 88 are permitted respectively to contract and to expand and the table 5 and the cutters 20 are retracted from the milling area, and a cycle resulting in the complete desired milling of one piece 10 has been completed.

Referring now somewhat in detail to the structure and assembly of the several elements effecting the aforementioned broadly stated operations, driving power is furnished by a motor 1, Figures 1 and 6, to whose shaft is secured a pulley 21 over which runs a belt 22 which also engages a pulley 23 secured to a vertical shaft 24. This shaft 24 is a primary driving element which extends throughout the height of the machine and is rotatably mounted adjacent the top in the frame member 2, intermediate the top and bottom in a flange on a sub-frame 79, and at the bottom in a bearing box 78 mounted on the flange 122 secured to the front wall 121 of the sub-frame 79 in turn mounted on the machine base 4. The shaft 24 effects the rotation of the cams 85 and 105, Figures 1, 10, and 11, and also effects the rotation of the cutter 30, Figures 1 and 10, through the several means hereinafter described in detail.

For effecting the driving of the cams 85 and 105, a spiral gear 61, Figure 11, is secured to and adjacent the bottom of the shaft 24 and engages a gear 62 secured to a cross shaft 63, Figures 10 and 11, adjacent the end of which is secured a gear 64 meshing with a gear 65 secured to a parallel cross shaft 66, both of which shafts 63 and 66 are mounted in the sub-frame 79, Figures 1, 10, and 11, to which shaft 66 the cams 85 and 105 are secured, Figures 1 and 11. The assembly is such as to effect the driving of the cams 85 and 105 in the directions indicated by the arrows in Figures 1 and 11.

Figures 7, 8:
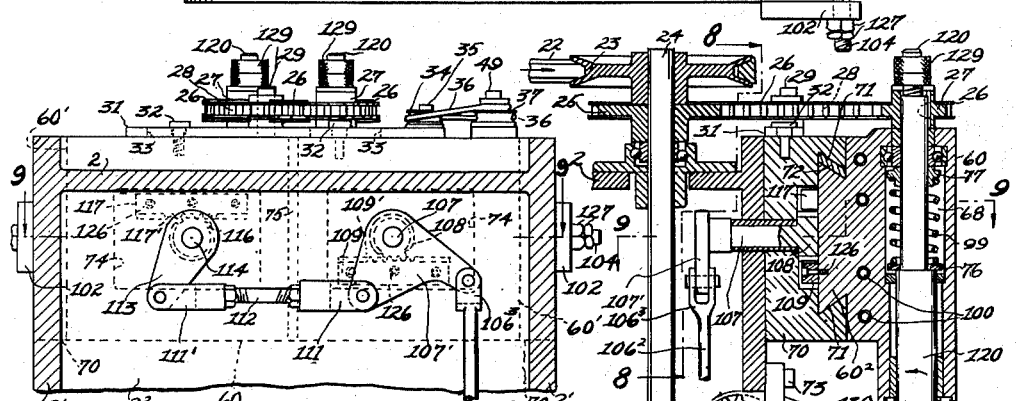
Figure 7 is a fragmentary longitudinal vertical section, taken in the planes indicated by the line 7—7, Figure 6.
Figure 8 is a fragmentary transverse vertical section, taken in the planes indicated by the line 8—8, Figure 7.

The driving of the milling cutter 30 by the shaft 24 is effected by a spiral gear 42 secured to and intermediate the height of the shaft 24, Figures 1, 7, and 10, and engaging a gear 43 secured to a cross shaft 44, rotatably mounted in a bracket 39 which is, in turn, mounted on the frame wall 2², to the end of which cross shaft 44 is secured a gear 45 meshing through an idler 46 with a gear 47 secured to the end of the cutter spindle 130 also mounted in the bracket 39. The directions of rotation are such as shown by the arrows in Figure 10.

Secured to the shaft 24 adjacent the pulley 23 is a sprocket 25, Figures 1 and 6, which is engaged by a chain 26 which also engages a pair of sprockets 27 secured to the reciprocable miller spindles 120, thus rotating the pair of milling tools 20 respectively depending from the spindles 120. The miller spindles 120 are respectively mounted in a pair of slides 60 reciprocable toward and from each other in a manner and for a purpose hereinafter fully described.

In order to provide for the changing in effective length of the chain 26, necessitated by the approach to and receding from each other of the opposed cutter spindles 120 around which spindles 120 as a unit the chain 26 plays, Figure 6, a sprocket 28, Figures 6 and 8, reciprocable crosswise of the top of the machine, is engaged by the chain 26 between the sprockets 25 and 27 and upon those sides of the latter tending to force the chain 26 into engagement with the sprockets 25 and 27, as fully shown in Figure 6, the reciprocation of the sprocket 28 being permitted by securing it to an upright pin 29 whose bottom end is seated in a plate 31 having a pair of spaced elongated slots 33 through which the plate 31 is slidably secured to the top of the machine by headed pins 32. The plate 31 is held to effect an engaging position of the sprocket 28 and the chain 26 by a depending weight 48, Figure 1, attached to one end of a cable 36 which plays over a pulley 38 and thence a second pulley 37, which pulleys are rotatably mounted on the frame member 2, and a frame block 70 mounted on the front face of the vertical frame wall $2^2$, respectively, and thence over a pulley 34 secured by a pin 35 to the plate 31, and thence is looped by its opposite end over a pin 49 upon which the pulley 37 is rotatably mounted.

Claims to the sprocket chain gearing just described are presented in my pending application Serial No. 586,591, filed April 4, 1945, Patent No. 2,428,940, granted October 14, 1947.

The feeding of the table 5 whereby the work 10 is fed into the cutter 30, is effected through a sub-table member 50 mounted on the front frame supporting member 3 and secured to the table 5, Figures 1, 2, 10, and 12, but adjustable relatively to the latter, for a purpose hereinafter fully described, the table member 50 having a rack portion 98 depending from its bottom face whose teeth $98^1$ engage the teeth $97^1$ of a gear segment 97. This gear segment 97 is actuated through the cam 85 and roller 90, hereinbefore mentioned, as follows: Referring to Figures 1, 10, 11, and 12, it will be noted that the roller 90 is rotatably mounted in the bottom ends of a pair of depending lever arms 91 which, at their upper ends, are made integral with a hub member 92 rotatably mounted upon a cross shaft 89 and having a forwardly and downwardly extending arm 95 formed therewith and mounted at its outer end on a pin 125 in an end clevis portion $93^1$ of a rod 93 which passes through the frame wall $2^2$ and at its other end by a clevis $93^2$ is pivotally secured to a lever arm 94 secured to a cross shaft 96 mounted in the front frame supporting member 3, to which cross shaft 96 a hub member $97^2$ of the gear segment 97 is secured.

Claims to the improvements in work-table feeds, in part just described, are presented in my pending application Serial No. 586,594, filed April 4, 1945, and now abandoned.

The actuation of the reciprocable miller spindles 120 by the action of the cam 105 is as follows:

Referring to Figures 1, 7, 8, 9, 10, and 11, the cam roller 110 is rotatably mounted upon a pin 123 secured in one end of bifurcated lever arms $115^1$ secured at their other ends to the hub $115^2$ of a forwardly longitudinally extended lever 115, said hub $115^2$ being rotatably mounted on the shaft 89, the opposite end of the arm 115 being pivotally secured by pin 124 to the bottom end clevis portion $106^1$ of a vertical rod 106. The rod 106 is connected by a turnbuckle 118 to an upper rod portion $106^2$ having an upper end clevis portion $106^3$ by which it is pivotally connected to one end of a rock arm $107^1$ fixedly mounted intermediate its ends upon a shaft 107 rearwardly extended from the frame block 70 and having a forward end gear portion 108 meshing with rack teeth $109^1$ whose body portion 109 is secured by screws 126 to a slide 60 in which one of the miller spindles 120 is mounted.

The other end of the rock arm $107^1$ is pivotally secured to a clevis 111 which in turn is secured by a right and left threaded rod 112 to a clevis $111^1$ pivotally secured to a lever 113 fixedly mounted on a second shaft 114 rearwardly extended from the frame block 70 and having an end gear portion 116 meshing with the teeth $117^1$ of a rack plate 117 secured to a second slide 60 in which the opposite miller spindle 120 is mounted. The rack plates 109 and 117 are disposed in elongated recesses 74 formed in the front face of the block 70, over which block 70 the supports 60 for the spindles 120 slide. The rack plate 109 is positioned at the bottom of one recess 74 and its rack portion $109^1$ engages the bottom of the gear 108; whereas, the rack plate 117 is positioned at the top of the other recess 74 and its teeth engage the gear 116 at the top, so that downward and upward movements, respectively, of the rod 106, Figure 1, cause the miller spindles 120 to approach each other and to recede from each other.

Figure 9:
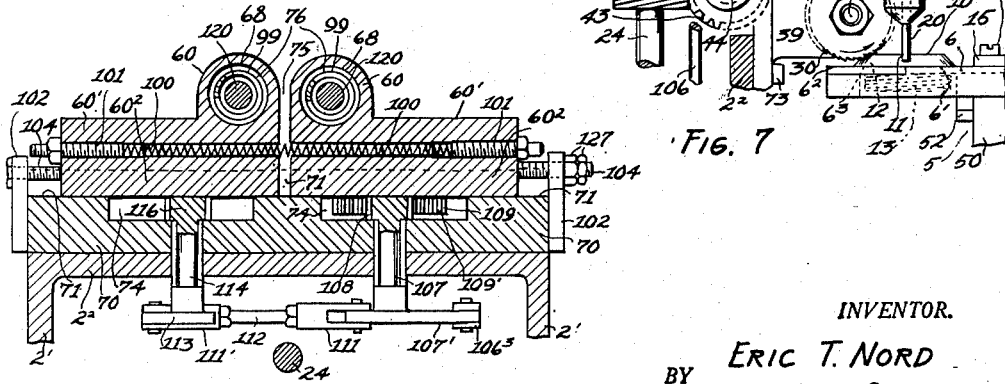
Figure 9 is a fragmentary horizontal longitudinal section, taken in the planes indicated by the line 9—9, Figures 7 and 8.

When the cam roller 110 drops into the low portion of the cam 105 and thus terminates the downward pull by the forward end of the lever 115 maintained on the rod 106 when the roller 110 is riding on the high part of the cam 105, the compression spring 88, Figures 1 and 11, which surrounds an upright rod 86 and is confined between a spaced abutment $87^1$ secured to said rod 86 and a bushing 87 mounted on the flange 122 of the sub-frame 79, effects the upward movement of the arm 115 since the upper end of the rod 86 is pivotally connected by an upper end clevis portion $86^1$ to a pin $86^2$ mounted in the arm 115, thus spreading the spindle slides 60. Furthermore, the spreading of the slides 60, Figure 9, is aided by a plurality of compression springs 100, Figures 1, 6, and 9, abutting at their ends against elongated adjustable bolts 101 passed transversely into the side faces of the respective slides 60.

The table 5 is so constructed as to permit the clamping of a work-piece 10 therein preliminarily to the movement of the table toward the milling area and to effect such clamping of the piece 10 the following structure is provided:

The table 5 is formed with a longitudinal recess $5^1$ extending from its front edge to the front edge of a plate $6^2$ at the transverse center line of the milling area which recess $5^1$ accommodates a plate 6, the plates 6 and $6^2$ having longitudinally opposed parts which are so shaped and can be so disposed as to provide an opening through which the shank 13 of the piece 10, Figures 3, 4, and 5, may be passed when the plate parts 6 and $6^2$ are sufficiently spaced, as hereinafter fully described. The opposed edges of these plate parts 6 and $6^2$ are of arcuate formation so as to form, when in their closed position, a substantially complete plate circle adapted to engage the annular side recess 14 of the piece 10. The opposed edges of the plate members 6 and $6^2$ forming this circle are under-beveled or of lip construction $6^1$ and $6^3$, Figures 1, 10, and 12, whereby they are readily inserted under the top flange 17 of the piece 10. Intersecting the recess $5^1$ of the table 5 in which the plate part 6 is seated is a lower recess 7 through which and the recess $5^1$ passes an upstanding pin 51 rotatably seated in the underlying body portion of the table 5. This pin 51 is formed with an eccentric 40 positioned in and of a depth equal to the combined depth of the recesses 5¹ and 7 and passes through an elongated opening 8 in the plate member 6 of the same width as the long axis of the eccentric 40 and whose front and rear walls 8¹ and 8² are engaged, respectively, by the eccentric 40 when the latter is turned, to effect opening movements and closing movements, respectively, of the plate member 6. It is evident then that these opening movements and closing movements are, respectively, forward movements and rearward movements of the plate 6 on the table 5. The turning movement of the eccentric 40 is afforded by a handle 41¹ secured to a block 41 which in turn is adjustably secured by a set screw 69 to the pin 51 and is mounted on an underlying bearing block 9 which is secured to the table 5 by screws 119 and through which the rotatable pin 51 passes.

The plate 6 at its rear end is retained in the recess 5¹ by a bar 15 which is secured by screws 16 at its ends to the side portions of the work table 5, and the plate member 6² is secured to the corresponding end of the underlying portion of the work table 5 at each side by a pair of screws 128.

From the aforegoing description, it is evident that, in the position of the handle 41¹ shown in Figures 1, 10, and 12, the most extended portion of the eccentric 40 which is shown as being extended toward the milling area has forced the plate part 6 into tight engagement with the work piece 10 which in turn has been forced into tight engagement with the rear plate member 6². In fact, due to the action of the gear segment 97 and its associated elements, the work-piece 10 has been forced by the subsequent working movement of the table 5 into the milling cutter 30 far enough to have completed the milling cut 12, in the position of the elements shown in the accompanying views. When the table 5 has been retracted from the working area, then a turning of the handle 41¹ will further retract the plate member 6 through the action of the eccentric 40 so that an opening is provided between the plate members 6 and 6² large enough for the withdrawal of the completed piece 10 and for the insertion of the next piece 10.

To provide means to aid the retraction of the plate member 6, when the handle 41¹ is actuated to induce such retraction, a compression spring 83, Figures 1, 10, and 12, is mounted in a recess 81 formed in the table member 5 adjacent the milling area, which compression spring 83 abuts against a pin 82 slidable in the recess 81 and depending from the plate member 6.

A positive stop is provided for the forward movement of the table 5 into the milling area. This stop operates when the table 5 has carried the work 10 sufficiently into the working area to have enabled the rotary cutter 30 to complete the full milling operation effecting the cut 12. This stop is a screw 67, Figures 1, 2, 10, and 12, which engages and is stopped by the front wall 3 of the machine frame when the table 5 has moved into and through the milling area sufficiently to complete the milling operation effected by the cutter 30. The screw 67 is adjustably mounted in the lower end of a bracket 58 which is secured at its upper end by screws 59 to the sub-table member 50. During the forward and retracting movements of the work table 5 into and out of the working area, the sub-table member 50 moves with the table 5 and is an integral part thereof for such forward and retracting purposes. The rigid connection of the table members 5 and 50 for working purposes is effected by set screws 54, Figures 1, 2, and 10, which pass into the table member 50 and against T-shaped depending tongues 52 of the table 5 seated in and longitudinally adjustable of complementary grooves 53 formed in the table member 50. When it is desired to adjust the table 5 with relation to the sub-table 50, such adjustment can be made, without disturbing the underlying rack and gear setting, by loosening the screws 54 and sliding the table 5 in the sub-table 50 by means of the tongues 52 and grooves 53 and then tightening the screws 54 in the new adjusted position of the table 5. To the extent desired, also, the adjustment of the working stroke may be secured by manipulating the stop screw 67 in the bracket 58, and to that extent not adjusting the table members 5 and 50. Further adjustments in the location of the table travel which may become necessary to suit adjustments of the screw 67 may be effected by adjusting the clevis 93² upon its rod 93.

The sliding of the combined table structure 5—50 in the machine frame is effected by the following means:

The front frame member 3 is formed with an upper central extension 18, Figures 1, 2, and 12, in the upper surface of which an undercut dovetail recess 56 is formed which accommodates a complementary dovetail 55 adapted to slide longitudinally thereof and depending from the sub-table member 50. Depending from the central part of the bottom of the dovetail 55 is the rack body 98 having bottom teeth 98¹ engaged by the teeth 97¹ of the gear segment 97. A gib 84, Figure 2, is provided for insuring a snug sliding engagement of the dovetail 55 and recess 56 and is held in position by a series of side screws 57 passed through the frame part 18.

The structure permitting the reciprocation of the spindle slides 60 to and from each other and providing a positive stop for the inward reciprocation thereof is as follows:

The slides 60 are formed with rearwardly disposed outwardly-extended side portions 60¹, Figures 1, 2, 6, 7, and 9, having rear dovetails or tongues 60² with upper and lower rearwardly and respectively upwardly and downwardly beveled surfaces adapted to slide in complementary grooves 71 formed in the frame member 70. Gibs 72 are provided at the upper engaging surfaces of the tongue and groove members.

Secured by screws 103, Figure 1, to the side surfaces of the block 70 are a pair of forwardly extending brackets 102 through the forward ends of which freely pass elongated screws 104, Figures 6 and 9, secured in the respective slide side portions 60¹. Exteriorly of the brackets 102 the screws 104 are provided with nuts 127 which engage the brackets 102 upon the inward movements of the slides 60 thus to form stops limiting such inward movements. Adjustment of the nuts 127 will adjust the amount of inward movement of the slides 60. The spacing between the slides 60 in their closed innermost positions is indicated by 75, Figures 2, 6, 8, and 9.

Surrounding the spindles 120 and contained in chambers 68 formed in the slides 60 are compression springs 99 for holding the end mills 20 in the desired lowermost cutting position, the springs 99 bearing against upper fixed abutments 77 and lower sliding abutments 76 whose downward movement is limited by nuts 129 provided upon the upper ends of the spindles 120.

What I claim is:

A work-holder for a machine tool comprising a table, a work-pocket member secured to the table and presenting an arcuate end portion having an undercut edge, a second member slidably mounted on the table and having a complementary opposed arcuate end portion with an undercut edge, the undercut edges forming lips adapted in closed position of the members to engage the work, the table being formed with a recess engaged by the second member for the slidable movements of the latter, the table being formed with a second recess opening into the first recess, a pin rotatably mounted in the table, passing through both of said recesses, and having an outwardly-extended handle member, the second member being formed with an elongated opening therethrough, and the pin having an eccentric portion adapted to engage opposed walls of the opening and depending into the second-mentioned recess.

ERIC T. NORD.

REFERENCES CITED

The following references are of record in the file of this patent:

UNITED STATES PATENTS

| Number | Name | Date |
| --- | --- | --- |
| 1,254,589 | Forsman | Jan. 22, 1918 |
| 1,382,793 | Lewis | June 28, 1921 |
| 1,452,506 | Hervig | Apr. 24, 1923 |
| 1,796,763 | Patterson | Mar. 17, 1931 |
| 1,894,232 | Coe | Jan. 10, 1933 |
| 2,223,323 | Koch | Nov. 26, 1940 |
| 2,411,790 | Hadley | Nov. 26, 1946 |